Oct. 18, 1932.  D. E. GAMBLE  1,883,682
FRICTION CLUTCH
Filed May 15, 1926
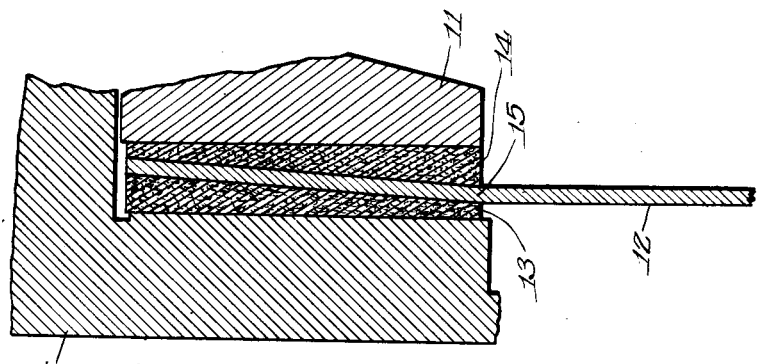
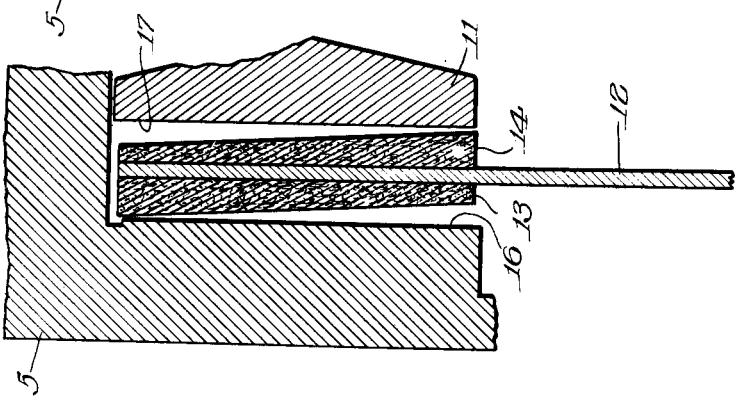
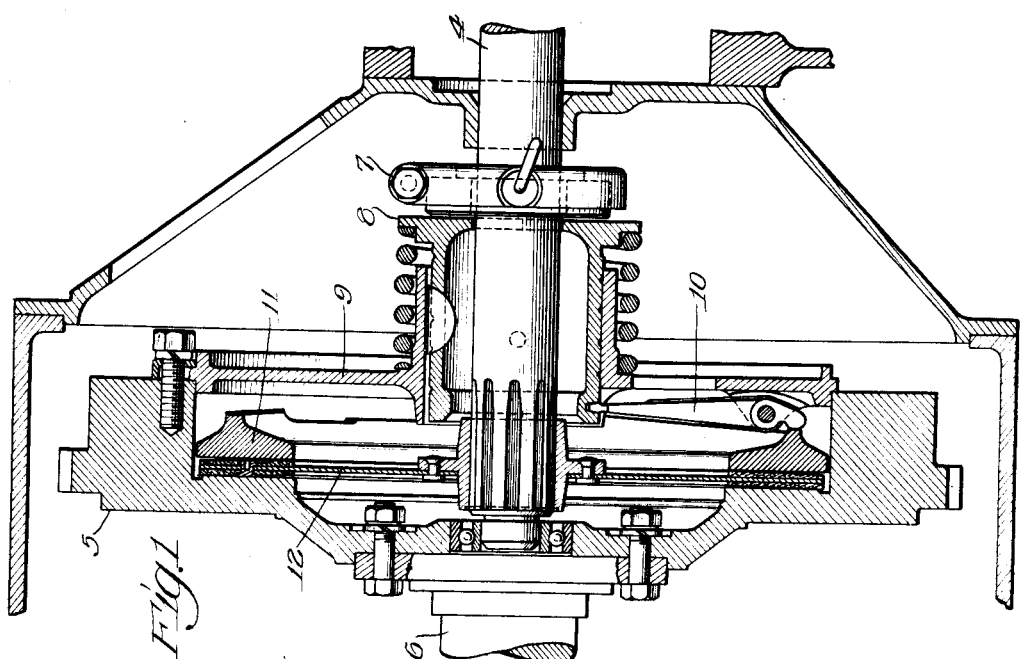
Inventor:
David E. Gamble
By Wm. A. Bell Atty.

Patented Oct. 18, 1932

1,883,682

UNITED STATES PATENT OFFICE

DAVID E. GAMBLE, OF DETROIT, MICHIGAN, ASSIGNOR TO THE BORG & BECK COMPANY, OF CHICAGO, ILLINOIS, A CORPORATION OF ILLINOIS

FRICTION CLUTCH

Application filed May 15, 1926. Serial No. 109,239.

This invention relates to clutches and its object is to make the clutch take hold gradually and without shock or jar.

A further object of the invention is to provide the clutch with a driven plate of novel construction which is changed in form and placed under tension under pressure of the clutch, which tension increases with the pressure and thereby forms a cushion which makes the clutch take hold gradually and easily and without grabbing.

In the accompanying drawing illustrating the invention in a selected embodiment

Fig. 1 shows the invention embodied in an automotive friction clutch.

Fig. 2 is an enlarged detail sectional view of parts of the clutch in release position.

Fig. 3 is a view similar to Fig 2 showing the clutch engaged.

Referring to the drawing 4 is a driven shaft, 5 is a fly-wheel, 6 is a driving shaft, 7 is the clutch release device, 8 is the clutch release sleeve, 9 is the cover plate, 10 are the operating levers and 11 is the cam ring.

The clutch as thus far described forms no part of the present invention; it is selected for the purpose of showing one embodiment of the invention and it is to be understood that the invention is not restricted to use with this particular clutch.

The driven plate 12 is flat and is provided on opposite sides, adjacent its periphery, with friction rings 13, 14. These rings constitute friction facings on opposite sides of that portion of the driven plate which is clamped or clutched between the cam ring 11 and the fly-wheel 5 to engage the clutch. These facing rings are made of any suitable friction material, preferably some non-compressible material, and they may be as wide as required for each particular embodiment of the invention.

It is customary at the present time to provide the driven plate of a clutch with friction facing rings, but, so far as I am aware, these rings have always been of the same thickness throughout and when the cam ring is operated to engage the clutch the friction surfaces of the two facing rings take hold throughout their entire area at the same time, often causing the clutch to grab and producing a severe shock and jar. I aim to avoid this objection to clutches heretofore made by making the driven plate and the friction ring facings in a novel manner so that the clutch will engage gradually without grabbing and without producing a shock and jar. I attain this end by tapering each ring radially, one being thinner at its inner edge than at its outer edge and the other being thinner at its outer edge than at its inner edge thus forming rings substantially trapezoidal in cross section. By tapering the rings oppositely as described, they take a concavo convex form, the ring 13 being concave and the ring 14 being convex when the driven plate is viewed in a plane from the sides. The construction is preferably such that throughout the width of the friction rings the driven plate as a unit, including the rings, is of the same thickness so that uniform contact throughout the area of the friction rings will be made under pressure. When the clutch is disengaged the plate 12 is flat. The friction ring 13 is closer to the fly-wheel at its outer edge than at its inner edge. The friction ring 14 is closer to the cam ring at its inner edge than at its outer edge. It will be apparent that when the cam ring is moved to engage the clutch it will first engage adjacent its inner edge the friction ring 14 and then the friction ring 13 adjacent its outer edge will be engaged with the fly-wheel. As the pressure progresses more of the surface of the rings will be engaged until finally all of the surface of the rings is engaged with the cam ring and the fly-wheel. This involves a kinking of the driven plate annularly at 15 and places the outer portion of the plate under tension. This kinking is produced because the opposing friction faces 16, 17 of the fly-wheel and the cam ring are parallel, the driven plate 12 is flat and the friction rings 13, 14 are concavo convex. It is not material which of the friction rings is on one side of the driven plate 12 and which on the other since in either arrangement they will present the same concavo convex form and produce an equivalent kinking effect. It is apparent that if the position of the friction rings as they appear in Fig. 2 is reversed, there will be a reversal of direction of the kink as it appears in Fig. 3. I prefer that the inner face of each friction ring should lie in a normal plane and produce the concave or convex effect in the ring by tapering the outer face of the ring radially, but it may be found desirable for some purposes to provide the concavo convex effect in some other manner and while I believe the construction and arrangement shown and described is superior to any other I do not wish to restrict myself in this detail.

My invention provides means whereby the clutch is enabled to take hold gradually and progressively to full engagement. This prevents the clutch from grabbing and avoids shocks and jars. It will be observed that as the cam ring approaches the fly-wheel the driven plate is first engaged at and adjacent the outer edge of the friction ring 13 at and adjacent the inner edge of the friction ring 14 and the contact area between these parts progressively increases with continued movement of the cam ring until there is full contact and engagement of the clutch. The kinking of the driven plate 12 provides a certain resistance to the engaging movement of the cam ring which tends to prevent too sudden and abrupt movement of this ring and this assists in providing a gradually engaging clutch.

It is desirable that a clutch should disengage quickly and this is accomplished with my invention because the kink starts to flatten out as the pressure is released and the area of contact between the fly-wheel member and the cam ring member and the friction rings of the driven plate immediately begins to reduce with the release of pressure and as the kink begins to flatten out. This is a progressive movement which continues until there is no longer contact between the driven plate and the clutch members.

I have shown one embodiment of the invention which will be satisfactory for many different clutch assemblies, but it may be necessary to change the form, construction and arrangement of parts for different adaptations of the invention and I reserve the right to make all changes coming within the scope of the following claims.

I claim:

1. A driven plate for a friction clutch having oppositely disposed friction rings thereon, one of said rings being thicker at its outer edge than at its inner edge.

2. A driven plate for a friction clutch having oppositely disposed friction rings thereon, one of said rings being thinner at its outer edge than at its inner edge and the other ring being thicker at its outer edge than at its inner edge.

3. In a friction clutch, the combination of a relatively fixed clutch member, a relatively movable clutch member, and a driven plate having friction faces located between said members, and friction rings on the sides of said plate, said friction rings varying in thickness radially to cause said plate to kink under pressure between said members.

4. In a friction clutch, the combination of a relatively fixed clutch member, a relatively movable clutch member, and a driven plate having friction faces located between said members, and friction rings on the sides of said plate, said friction rings tapering radially and oppositely to cause progressive contact of said members therewith under pressure.

5. In a friction clutch, the combination of a relatively fixed clutch member, a relatively movable clutch member, and a driven plate having friction faces located between said members, and friction rings on the sides of said plate, said friction rings tapering radially and one being thinner at its outer edge than at its inner edge and the other being thicker at its outer edge than at its inner edge to cause progressive contact between the rings and said members and said plate to kink under pressure.

6. A driven plate for a friction clutch comprising a metal member having substantially flat parallel faces throughout, and friction rings embracing the same, said plate being concavo convex at its frictional contact area.

7. A driven plate for a friction clutch, the same comprising a metal member having substantially flat parallel faces throughout, and oppositely disposed friction rings embracing the same, said rings being radially tapered.

8. A driven plate for a friction clutch, the same comprising a practically rigid member and friction rings upon opposite sides thereof, said rings being substantially trapezoidal in cross section, with a thin edge of one ring adjacent a thick edge of the other ring the outer faces of said rings being substantially flat throughout their entire surfaces.

9. A driven plate for a friction clutch embodying a substantially flat member having oppositely disposed friction rings thereon, said rings each having a face out of parallelism with said member, the outer faces of said rings being brought into parallelism with the central portion of said flat member under pressure and the outer portion of said member being placed under tension.

10. A driven plate for a friction clutch, embodying a metallic member adapted to flex under pressure and friction rings thereon, with their outer faces out of parallelism with said member and parallel with each other.

DAVID E. GAMBLE.